United States Patent
Schindler

(10) Patent No.: US 8,909,958 B2
(45) Date of Patent: Dec. 9, 2014

(54) POWER LOAD SHEDDING BASED ON A VOLTAGE DROP RATE ASSOCIATED WITH A POWER SOURCE AND A PREDETERMINED VOLTAGE

(75) Inventor: Frederick Roland Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 13/174,826

(22) Filed: Jul. 1, 2011

(65) Prior Publication Data

US 2012/0216056 A1 Aug. 23, 2012

Related U.S. Application Data

(60) Provisional application No. 61/445,422, filed on Feb. 22, 2011.

(51) Int. Cl.
| | | |
|---|---|---|
| G06F 1/00 | (2006.01) | |
| G06F 1/26 | (2006.01) | |
| H04L 12/10 | (2006.01) | |

(52) U.S. Cl.
CPC ........ *H04L 12/10* (2013.01); *H04Q 2213/1308* (2013.01); *H04Q 2213/13389* (2013.01)
USPC .......................................... 713/320; 713/300

(58) Field of Classification Search
USPC ......... 713/300, 321, 324, 310, 330, 320, 340; 455/402; 700/295; 307/29
See application file for complete search history.

(56) References Cited

U.S. PATENT DOCUMENTS

| | | | |
|---|---|---|---|
| 7,921,307 B2 | 4/2011 | Karam et al. | |
| 7,921,314 B2 | 4/2011 | Schindler et al. | |
| 7,930,568 B2 | 4/2011 | Schindler | |
| 8,775,846 B2 * | 7/2014 | Robinson et al. | 713/340 |
| 2005/0272402 A1 * | 12/2005 | Ferentz et al. | 455/402 |
| 2006/0053324 A1 * | 3/2006 | Giat et al. | 713/300 |
| 2006/0082222 A1 * | 4/2006 | Pincu et al. | 307/29 |
| 2008/0114997 A1 * | 5/2008 | Chin | 713/321 |
| 2008/0114998 A1 * | 5/2008 | Ferentz et al. | 713/324 |
| 2009/0083552 A1 * | 3/2009 | Hussain et al. | 713/300 |
| 2010/0030392 A1 * | 2/2010 | Ferentz et al. | 700/295 |
| 2010/0042855 A1 * | 2/2010 | Karam | 713/310 |
| 2010/0058091 A1 * | 3/2010 | Lambert et al. | 713/330 |
| 2010/0106985 A1 * | 4/2010 | Panguluri et al. | 713/300 |
| 2011/0029787 A1 * | 2/2011 | Day et al. | 713/300 |

* cited by examiner

*Primary Examiner* — Thomas Lee
*Assistant Examiner* — Aurel Prifti
(74) *Attorney, Agent, or Firm* — Edell, Shapiro & Finnan, LLC

(57) ABSTRACT

In one embodiment, power from multiple inline power sources is collected. Power is supplied to powered network circuits from the collected power and any excess power from the collected power is supplied to downlink inline equipment. A worst-case power source loss scenario is determined based on power source and load information. Removal of an inline power source is detected and load power is reduced when the removed power source reduces the power required to operate the powered network circuits.

20 Claims, 10 Drawing Sheets

POWER LOAD SHEDDING BASED ON A VOLTAGE DROP RATE ASSOCIATED WITH A POWER SOURCE AND A PREDETERMINED VOLTAGE

CROSS REFERENCE TO RELATED APPLICATION

This application claims priority to U.S. Provisional Patent Application No. 61/445,422, filed Feb. 22, 2011, the entirety of which is incorporated herein by reference.

TECHNICAL FIELD

The present disclosure relates to inline power applications, such as Power over Ethernet (PoE).

BACKGROUND

Running alternating current (AC) power to various equipment in a facility is costly because it requires plans, permits, electricians and inspections. Power over Ethernet (PoE) is an inline power technology that is capable of delivering power over an Ethernet networking cable to various devices that have Ethernet connectivity.

In a PoE system, powered devices can be used to provide data and power connections. The power collected can be used to power network circuits and any excess power can be passed-through to downlink power sourcing equipment connections. At any time it is possible that one of the power sources may be removed, which impacts the amount of available power to support the network circuits and power connections that were served prior to the removal.

DESCRIPTION OF EXAMPLE EMBODIMENTS

Overview

In one embodiment, power from multiple inline power sources is collected. Power is supplied to powered network circuits from the collected power and any excess power from the collected power is supplied to downlink inline equipment. A worst-case single event source loss scenario is determined based on power source and load information. Removal of any one of the inline power sources is detected and load power is reduced when the removed power source reduces the power required to operate the powered network circuits.

Example Embodiments

In inline power systems, such as one that employs Power over Ethernet (PoE) technology, a device can be a power sourcing equipment (PSE) or a powered device (PD). A PSE is a PoE device that provides or sources power to other devices through the Ethernet cable. For example, a PSE can be an Ethernet switch. A PD is a device that is powered by a PSE through the Ethernet cable and thus consumes energy. For example, a PD can be a wireless access point or an Internet telephone. A PoE PD-PSE architecture is described herein according to various aspects that accommodates one or more PD uplink ports and PSE downlink ports. Power for the system may come from one or more PD ports or an auxiliary power port, e.g. an AC-DC power supply. The system architecture described herein complies with the IEEE 802.3 standard, but this is only an example.

Figure 1:
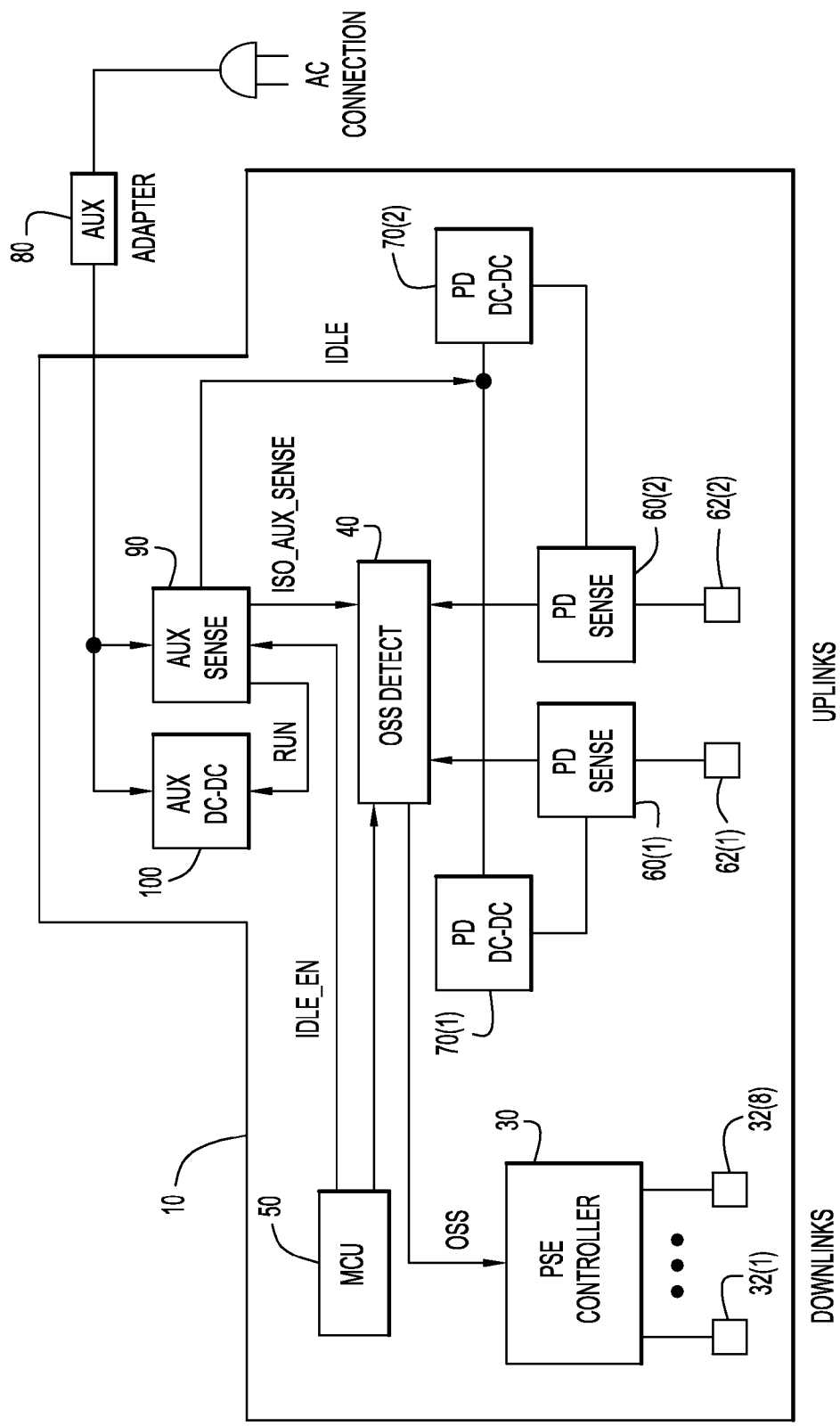
FIG. 1 is a block diagram showing an example of a device configured to adaptively reduce load power in an inline power system.

FIG. 1 shows an example topology of an inline, e.g., PoE, switch device 10. The device 10 includes a PSE controller 30, an over supply signal (OSS) detect circuit 40, a microcontroller unit (MCU) 50, PD sense circuits 60(1) and 60(2), PD DC-DC converter circuits 70(1) and 70(2), an auxiliary (AUX) connector 80, an AUX sense circuit 90, and an AUX DC-DC converter 100. The PSE controller 30 connects to downlink PSE ports 32(1)-32(8), e.g., eight downlink ports. PD sense circuit 60(1) and 60(2) connect to uplink ports 62(1) and 62(2), respectively, of the device 10. The PSE controller 30 is, for example, a "hot-swap" controller that controls turn on in a desired/controlled manner, and may include a transistor (e.g., a metal oxide field effect transistor) and state machine logic or a microcontroller to disable the transistor as needed. The details of the PSE controller 30 are not described herein as they are not relevant to the load shedding techniques of the present disclosure. The PD DC-DC circuits 70(1) and 70(2), and AUX DC-DC circuit 100 are DC-DC converter circuits that convert the DC level of sensed PD power to a suitable level for use by downlink network equipment. The power to the PSE controller 30 is provided from one of the DC-DC converters 70(1), 70(2) or 100.

The PD sense circuits 60(1) and 60(2) assert a PD_PRESENT signal when they detect uplink voltage that meets at least certain minimum operating requirements. Similarly, the auxiliary sense circuit 90 asserts an AUX signal when an auxiliary power supply is present. An auxiliary power supply is a power adapter such as, for example, a wall power supply device. Table 1 below shows an example system power source scheme.

TABLE 1

System Power Sources

| Pmax (W) | AUX | PD1 | PD2 | Comment |
|---|---|---|---|---|
| 51 | 1 | 0 | 0 | Auxiliary power is present. |
| 51 | 0 | 1 | 1 | Two Type 2 uplinks are present |
| 38.5 | 0 | 1 | 1 | One Type 1 and one Type 2 uplinks are present |
| 26 | 0 | 1 | 1 | Two Type 1 uplinks are present |
| 25.5 | 0 | One connected PD | | One Type 2 uplink is present |
| 13 | 0 | | | One Type 1 uplink is present |

The PD sense circuits 60(1) and 60(2) are also configured to sense failure or removal of a supply. This includes removal of the supply or significant reduction in the voltage of the supply. The MCU 50, PD sense circuits 60(1) and 60(2) and the AUX sense circuit 90 are connected to the OSS detect circuit 40. The OSS detect circuit asserts an OSS signal to the PSE controller 30. The OSS detect circuit 40 serves as a power removal detection circuit configured to detect removal of PD power and/or an auxiliary power supply.

Power source removals are detected using hardware to adjust budgets by shedding PoE power load as rapidly as possible, as described further below. Table 2 below shows power sources that have failed in the top row. The first column on the left shows what sources exist after the failure has been sensed. Empty cell regions of the table indicate failure scenarios that cannot exist. For example, 2 Type 2 PD devices (under the PoE standard) cannot become a Type 2 device and a Type 1 device. Cells containing a 0 indicate system changes that are handled by the MCU 50. The power does not decrease for these cases. The cells in Table 2 with negative numerical values show the maximum reduction in system power (W).

TABLE 2

Power Source Loss and Power Budget Change

| | Failing Source | | | | |
|---|---|---|---|---|---|
| | AUX | 2 T2 | T2 + T1 | 2 T1 | T1 |
| AUX | | | | | |
| 2 T2 | 0 | | 0 | 0 | 0 |
| T2 + T1 | −12.5 | | | 0 | 0 |
| 2 T1 | −25 | | | | 0 |
| T2 | −25.5 | −25.5 | −13 | | |
| T1 | −38 | | −25.5 | −13 | |

All power numbers are in watts.

Table 2 above assumes 100% efficiency.

When a power source is removed, the OSS detect circuit 40 generates the OSS described hereinafter. The PSE controller 30 responds to the OSS to remove power from ports enabled to reduce load. Table 3 below illustrates a power source failure monitoring scheme. Table 3 contains logical values. Therefore, an active low signal will be approximately 0 V when it is asserted (1).

TABLE 3

Power Source Failure Monitoring

| Power Sources | | | Enable | | |
|---|---|---|---|---|---|
| AUX | PD1 | PD2 | PD | AUX | Comment |
| Only one source | | | X | X | Disable OSS, via PSE controller or MCU overriding OSS. |

TABLE 3-continued

Power Source Failure Monitoring

| Power Sources | | | Enable | | |
|---|---|---|---|---|---|
| AUX | PD1 | PD2 | PD | AUX | Comment |
| 0 | 1 | 1 | 1 | 0 | Monitor for PD failure. |
| 1 | 1 | 1 | 1 | 1 | PD both Type 2, monitor for AUX and one PD fail. |
| 1 | 1 | 1 | 0 | 1 | One PD Type 1, monitor for AUX failure. |

Figure 2:
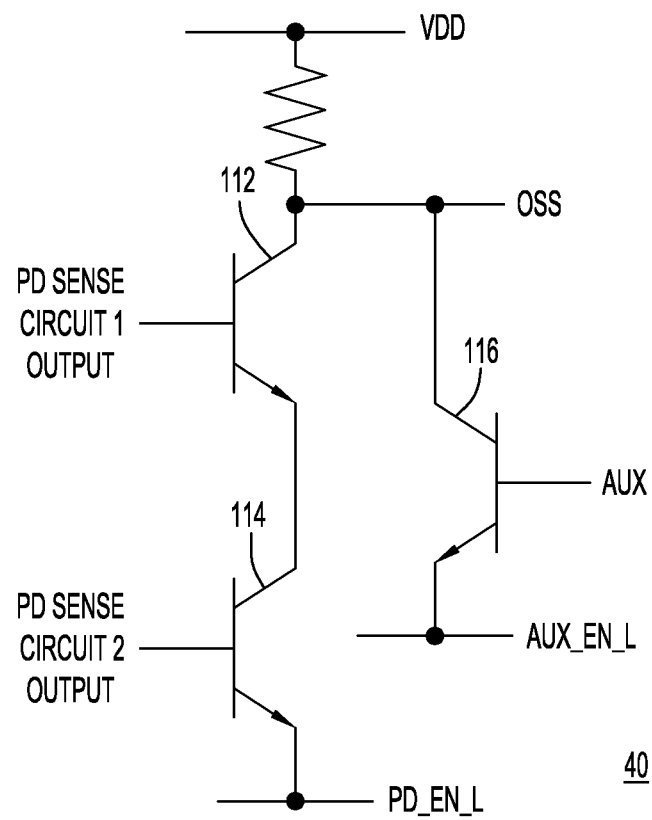
FIG. 2 is a schematic diagram showing an example of an over supply signal detect circuit in the device of FIG. 1.

Turning now to FIG. 2, an example schematic diagram of the OSS detect circuit 40 is now described. The OSS detect circuit 40 is a mixed-signal circuit (operating on digital and analog signals). The transistors 112 and 114 receive an input derived from outputs of PD sense circuits 60(1) and 60(2), respectively. The AUX presence sense transistor 116 is driven by the AUX signal. The PSE controller 30 and MCU 50 may disable the OSS operations. Signals AUX_EN_L and PD_EN_L permit the OSS detect circuit to disable operations when the associated power source (AUX or PD) is detected. One of the power sources needs to be enabled for monitoring in order for the presence of a power source to disable the OSS operations.

In operation, when enabled by the AUX_EN_L signal or PD_EN_L signal, the OSS detect circuit 40 responds to outputs from the PD sense circuits 60(1) and 60(2) and AUX sense circuit 90, and generates the OSS to the PSE controller 30. There is also a global OSS enable disable. The MCU 50 may drive the OSS signal to the de-asserted state when software sets up other control signals. The MCU 50 may also drive PD1 and PD2 to the PD_PRESENT state when that particular PD removal should not assert the OSS state. This setup prevents the PD removal from being sensed. A special case, not indicated in Table 3, occurs when there are inline power supplies PD1 and PD2 supply power and removing a specific one of these inline power sources will impact the power budget whereas removal of the other does not impact the power budget. This case can be addressed by overriding the PD that needs to be ignored. The OSS detect circuit 40 monitors the PD that affects the power budget, ignoring the other.

The PD sense operations may be modified to respond more quickly when the PD Media Dependent Interface (MDI) voltages drop faster than the IEEE PoE standard permits. The AUX sense circuit 90 senses the presence of the auxiliary supply. The voltage sensed may be scaled so that a lower op-amp supply voltage may be used. This circuit may also have a hysteresis modification similar to that described below for the PD sense circuits 60(1) and 60(2).

Figure 3:
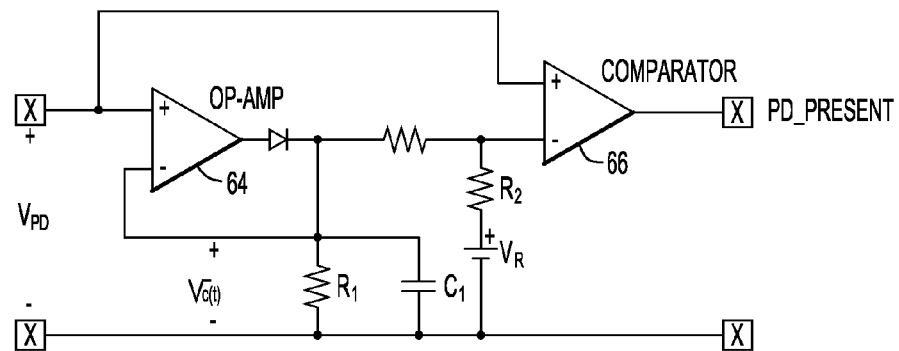
FIG. 3 is a schematic diagram of an example powered device sense circuit in the device of FIG. 1.

Reference is now made to FIG. 3 for a description of an example of a circuit that may be used for the PD sense circuits 60(1) and 60(2). In the schematic diagram of FIG. 3, the interface to the MDI is not shown. That interface would include the full-wave rectifier, for example. The voltage drop of the rectifier and other elements in the path from the MDI to the sense circuit would be accounted for, as may be appreciated by one with ordinary skill in the art. To simplify the explanation, $V_{MDI}=V_{PD}$ (PD voltage) present at the PD sensor circuit input. The operational amplifier circuit (op-amp) 64 is configured as a lossy peak detector. It detects the peak of $V_{PD}$ and then slowly falls when $V_{PD}$ drops. The rate of decay of the detected peak is determined by a time constant associated with resistors $R_1$ and $C_1$, e.g., $R_1 \times C_1$. The peak detected is summed with a reference voltage $V_R$ at an input to comparator 66, e.g., V−=½($V_{peak}$+$V_R$). The factor (½) used in the summer may be changed as required. The comparator 66 compares a voltage $V_{PD}$ at its first input, the V+ input, to a voltage at its second input, the V− input.

When $V_{PD}$ increases to the point that it exceeds the voltage at V−, the comparator 66 outputs a 'true' signal indicating that the PD input meets an IEEE requirement for normal PD operation, i.e., an inline power source (a PD) has been detected. The reference voltage $V_R$ voltage is adjusted depending on the type of PD detected, Type 1 or Type 2. Generally, $V_{PD}$>36 V for Type 1, and $V_{PD}$>41.4 V for Type 2. As mentioned above, other system voltage drops are taken onto account when selecting $V_R$. The PD sense circuit 60(1) is designed to operate below the IEEE minimum requirement.

Figure 5:
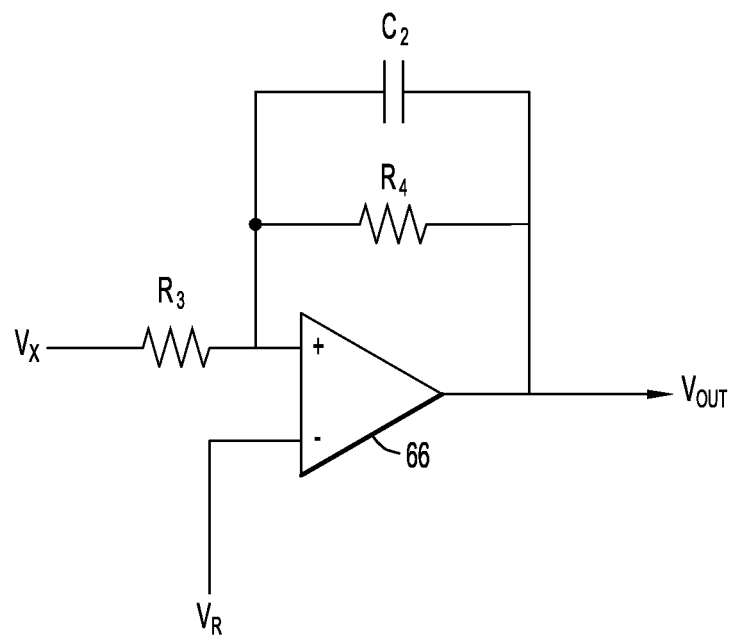
FIG. 5 is a schematic diagram for an alternative form of the powered device sense circuit.
Figure 6:
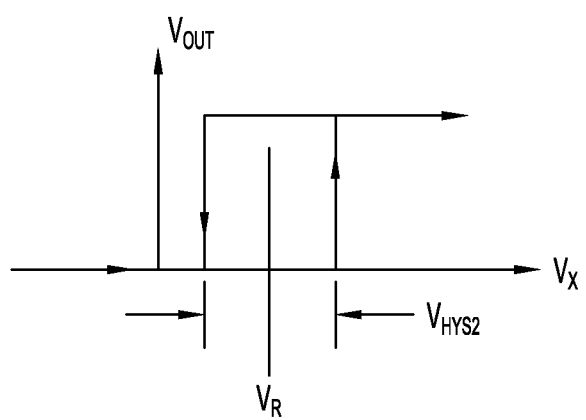
FIG. 6 is a plot depicting operations of the circuit shown in FIG. 5.

The comparator circuit 66 may be modified as shown in FIG. 5. In this configuration, positive feedback is used to create hysteresis for the point where the comparator output changes state. The hysteresis may be symmetric or non-symmetric depending on the desired response. An impedance (formed by capacitor $C_2$ and resistor $R_4$ connected in parallel in the feedback path) may be used to create a frequency dependent hysteresis. The hysteresis operation corresponding to the circuit of FIG. 5 is shown in FIG. 6.

Figure 4:
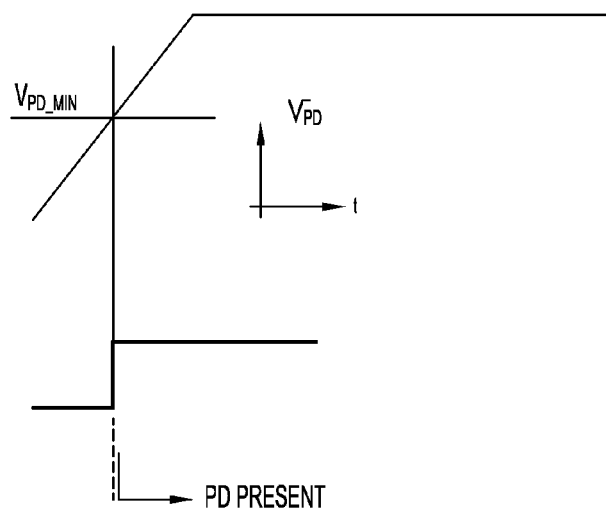
FIG. 4 is a plot depicting operations of the powered device sense circuit of FIG. 3.
Figure 7:
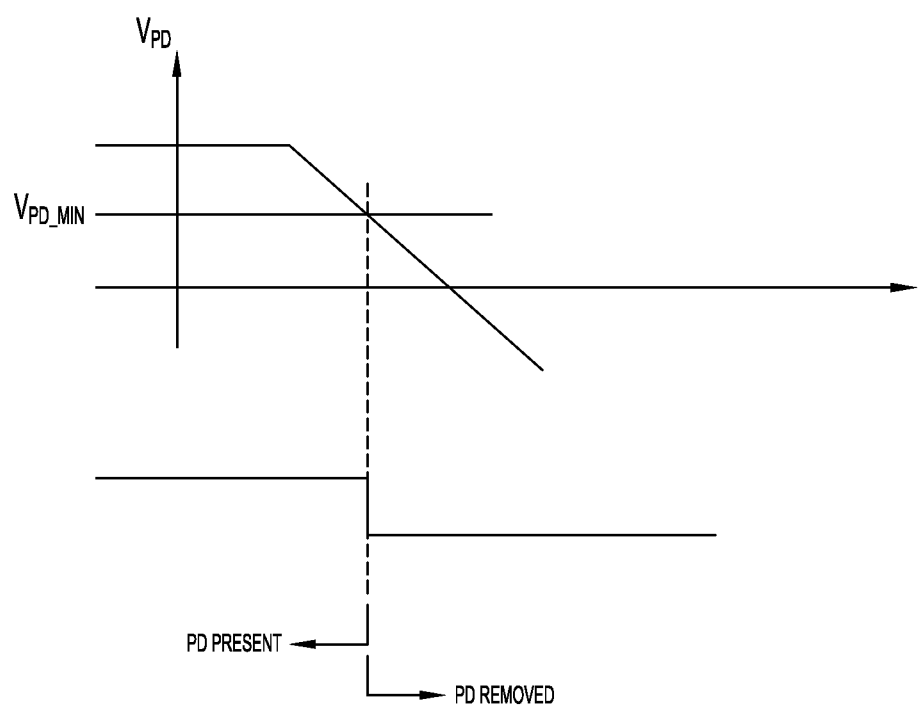
FIG. 7 is a plot depicting operations of the circuit of FIG. 3 under conditions of a slow drop of powered device voltage.

FIG. 7 shows the operations of the PD sense circuit of FIG. 3 when $V_{PD}$ falls slowly. When $V_{PD}$ drops slowly, the comparator circuit 66 transitions to the PD removed output state when $V_{PD}$ drops below a predetermined threshold. As in FIG. 4, when $V_{PD}$ is greater than $V_R$, a PD_PRESENT signal is asserted and the same holds true when $V_{PD}$ is greater than $V_R$+$V_{HYS2}$ when the comparator configuration of FIG. 5 is employed.

Figure 8:
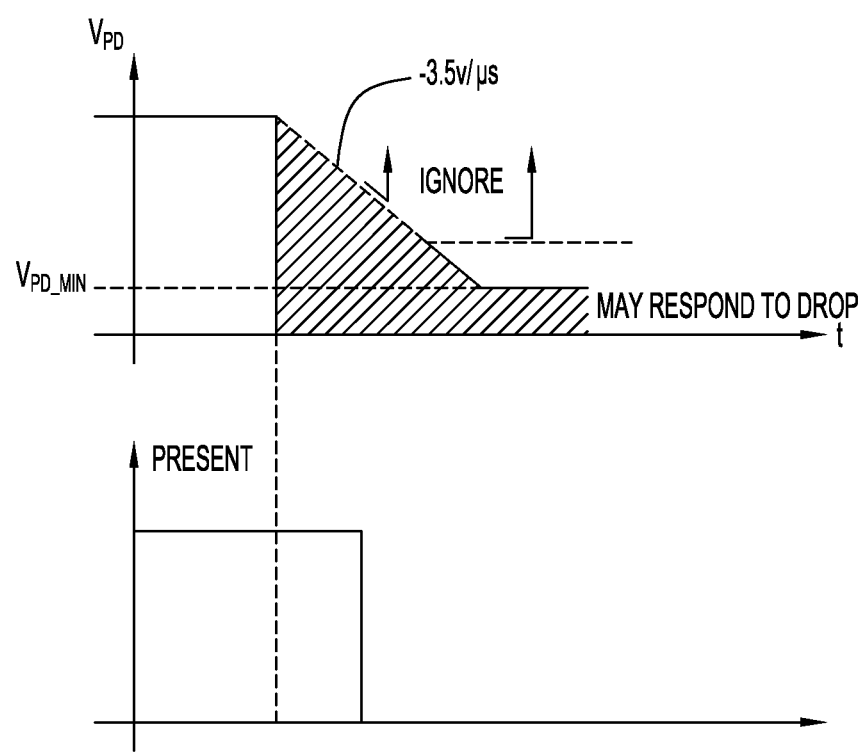
FIG. 8 is a plot depicting operations of the circuit of FIG. 3 under conditions of a fast drop of powered device voltage.

Turning to FIG. 8, the operation of the PD sense circuit of FIG. 3 is shown when $V_{PD}$ falls relatively rapidly. The lossy peak detector (op-amp 64) permits $V_{PD}$ slew rates that greatly exceed the IEEE allowed value for a PSE, which is −3.5V/μs, to cause the comparator 66 to transition to the PD removal state before the $V_{PD}$ minimum threshold is reached. This helps the system transition to an alternative power source before all the energy stored on the PD DC-DC bulk capacitors is depleted.

Determining the time constant associated with resistors $R_1$ and $C_1$ of the PD sense circuit (FIG. 3) is system dependent. In general, the peak detector voltage is Vc(t)=$V_{peak}e^{-t/\tau}$, where τ=R1C1, when the input voltage VPD is decreasing. When the output of the lossy peak detector summed with the voltage reference drops more slowly than the input voltage, the comparator 66 will transition to the PD removed/removal state.

FIG. 8 shows a shaded region where the comparator 66 may transition to the PD removed state. The rate of voltage change is important to this state transition. Differentiating the summing equation $$V_{PD}(t) < \frac{1}{2}\left(V_{peak}e^{\frac{-t}{\tau}} + V_R\right)$$

Yields $$\frac{dV_{PD}(t)}{dt} < \frac{-1}{2\tau}V_{peak}e^{\frac{-t}{\tau}},$$

ignoring hysteresis for simplicity. Using an IEEE standard limit of −3.5 V/μs, then $$-3.5 < \frac{-1}{2\tau}V_{peak}e^{\frac{-t}{\tau}}.$$

Thus, the PD sense circuit is configured to detect and respond before $V_{PD\text{-}MIN}$ is reached when the voltage drop, $dV_{PD}(t)/dt$>>3.5 V/μs, and to ignore a voltage drop at rates close to 3.5 V/μs that are above $V_{PD\text{-}MIN}$. Circuit component values are selected to make the system more responsive to a supply removal, which results in a rapid decay in $V_{PD}$, compared to a gradual decay in $V_{PD}$, causing a state change at a fixed threshold voltage.

Figure 9:
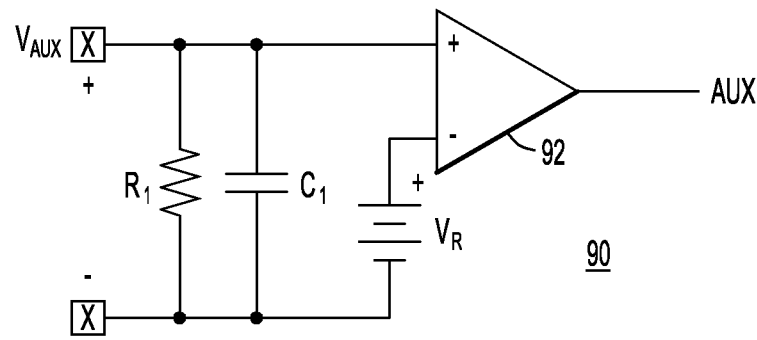
FIG. 9 is a schematic diagram of an example of an auxiliary power sense circuit in the device of FIG. 1.
Figure 10:
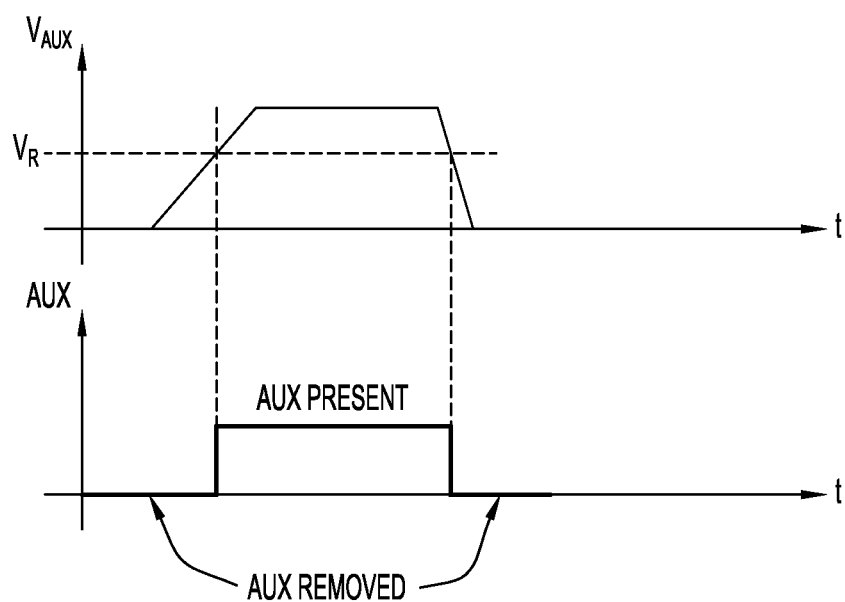
FIG. 10 is a plot depicting operations of the auxiliary power sense circuit.

Reference is now made to FIG. 9 for a description of an example schematic diagram of the AUX sense circuit 90. The AUX sense circuit 90 includes a comparator 92, resistor $R_1$, capacitor $C_1$ connected in parallel with the AUX voltage $V_{AUX}$, and a voltage reference $V_R$. With reference to FIG. 10, in operation, when $V_{AUX}$>$V_R$ the circuit 90 outputs an AUX present signal. Otherwise, it outputs an AUX removed state/signal. Resistor $R_1$ and capacitor $C_1$ help filter noise, and resistor $R_1$ pulls down the input when the auxiliary supply is removed. The voltage reference $V_R$ is selected so that the lowest acceptable auxiliary supply voltage produces the AUX present signal.

Figure 11:
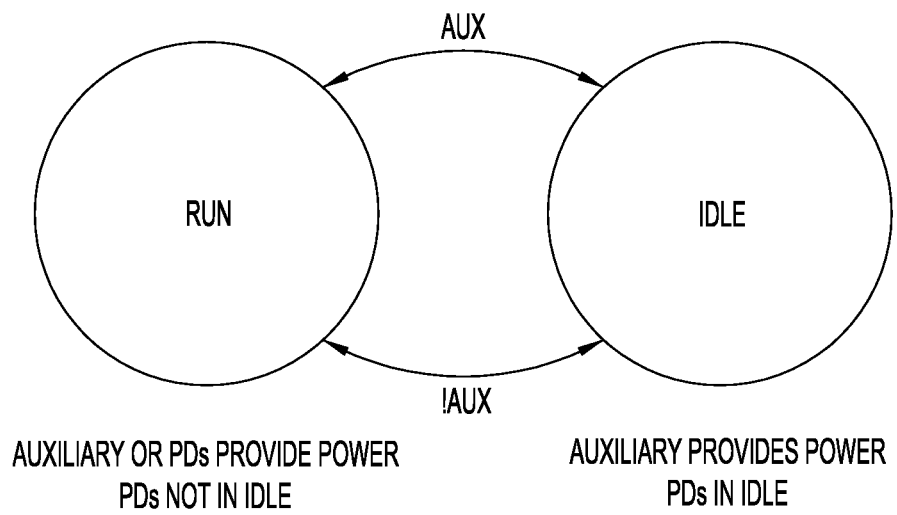
FIG. 11 is a state diagram depicting operations of the device of FIG. 1 when an auxiliary power supply is removed and reconnected.

Referring now to FIG. 11, a state diagram is shown for the operations of system 10 based on the presence of an AUX power source. As explained above, the AUX sense circuit 90 produces two signals, one to the AUX DC-DC converter circuit 100 (either RUN or OFF), and the other signal goes to the PD DC-DC converter 70(2) (either IDLE or RUN). The OFF state occurs when no power is provided to the PD. The two states are: IDLE and RUN. When in the IDLE state, the PDs draw at least the minimum holding power (as specified in the IEEE PoE specification). In the RUN state, the PDs may draw up to the full power value.

The system draws its power from the AUX supply when it is present. If a PD port is also connected, the system draws enough power from the port to maintain the power provided by the PSE controller 30. If the auxiliary supply power is removed, the PD connections assume the power demand responsibilities. Use of power is thus initiated from one or more of the inline PD sources upon detecting the removal of the AUX power supply.

The MCU 50 sets up the power priority of the auxiliary supply by controlling an IDLE_EN signal. When this signal is asserted, PDs draw at least the minimum IEEE specified holding power and the auxiliary connection provides the bulk of the power. The state of this signal depends on the order in which power sources are connected. This signal can be utilized to gracefully transfer power from a connected PD or PDs to the auxiliary supply. The AUX sense circuit 90 has circuit elements that create delays when changing state. The goal of these circuit elements is to rapidly move a new power source from IDLE/OFF to RUN and to delay the failing power source from going from RUN to IDLE/OFF.

Figure 12:
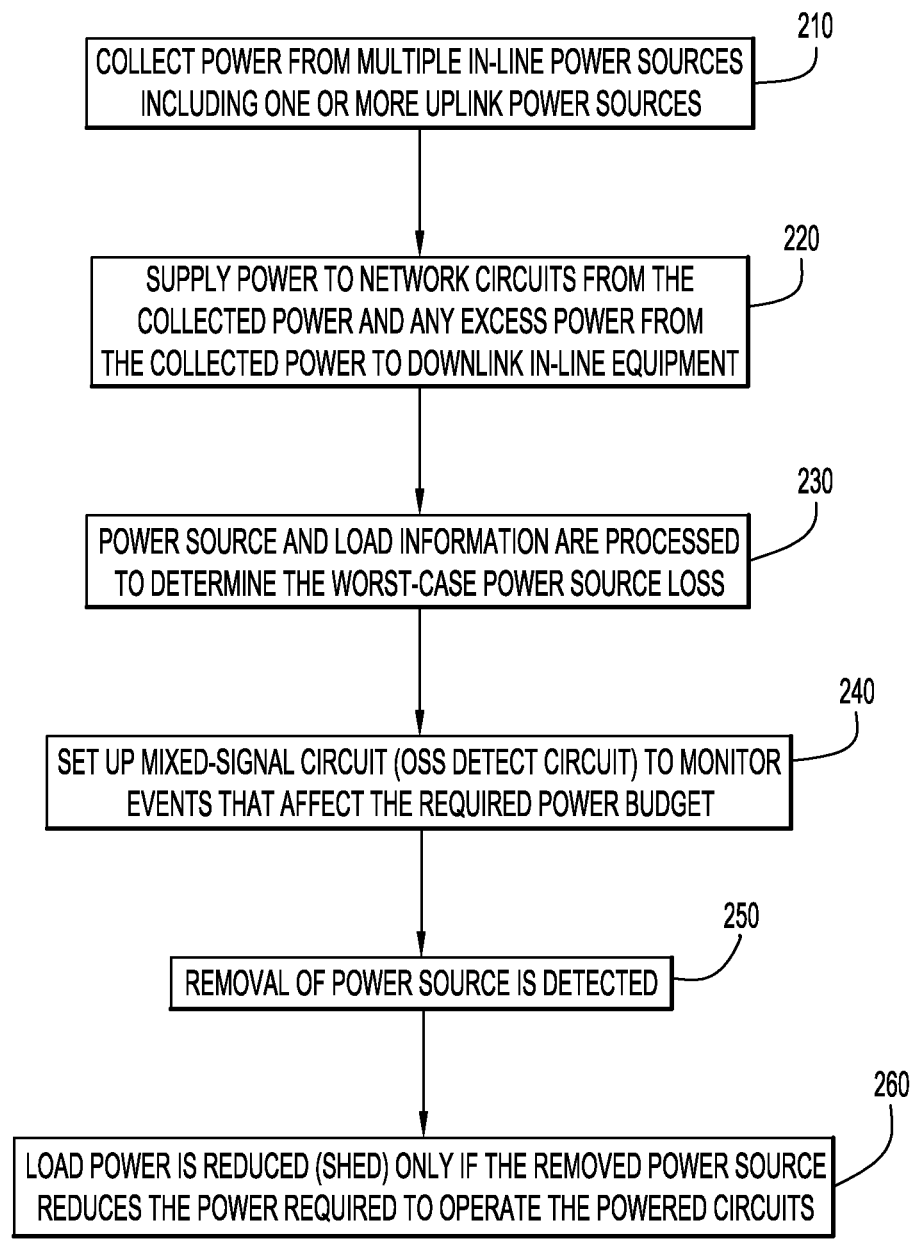
FIG. 12 is a flow chart depicting example operations of the device of FIG. 1.

Turning now to FIG. 12, a flow chart is shown depicting the overall operation of device 10 for the load shedding techniques. At 210, power is collected from multiple inline power sources including one or more uplink PDs. At 220, power is supplied to powered network circuits from the collected power and any excess power from the collected power is supplied to downlink inline equipment. At 230, power source and load information are processed (e.g., analyzed by the MCU 50) to determine the worst-case power source loss. In many cases, a single power source removal is detected and responded to. This information is reflected by, for example, Table 2, above. However, there is a special case (shown in Table 3) in which both the AUX source fails and one of the PD sources fails. OSS is low when either the AUX is present or both PDs are present. At 240, the MCU 50 sets up the OSS detect circuit 40 to monitor events that affect the power budget. At 250, removal of a power source is detected. If the AUX and one of the PDs is removed, then OSS will assert (go high), assuming both the AUX and PDs are enabled for monitoring as described above. Also, it is possible that the AUX may be removed, followed by a PD being removed in which case OSS is asserted. At 260, load power is reduced (shed) if the removed power source reduces the power available (required) to operate the powered circuits.

The following is an example. If it is determined that the system has 51+25.5+25.5 W of power available from various PDs and 13 W of output (consuming 13 W), then any power source can be removed without the need to shed power. On the other hand, if it is determined that the demand on the system is 26 W and AUX is removed, then load is shed to keep the power demand below what can be supplied. These calculations for power budget and power shedding are made to take into account system efficiencies.

There are cases where the system is powered by two PDs, one Type 1 and one Type 2. The PoE load may be supported by a single Type 2 PD connection. Load shedding may be set up on the MCU 50 to detect a single PD by changing the PD_PRESENCE signal to indicate a connected PD. This prevents the OSS detect circuit 40 (shown in FIG. 2) from recognizing/detecting a PD removal on the overridden signal.

Figure 13:
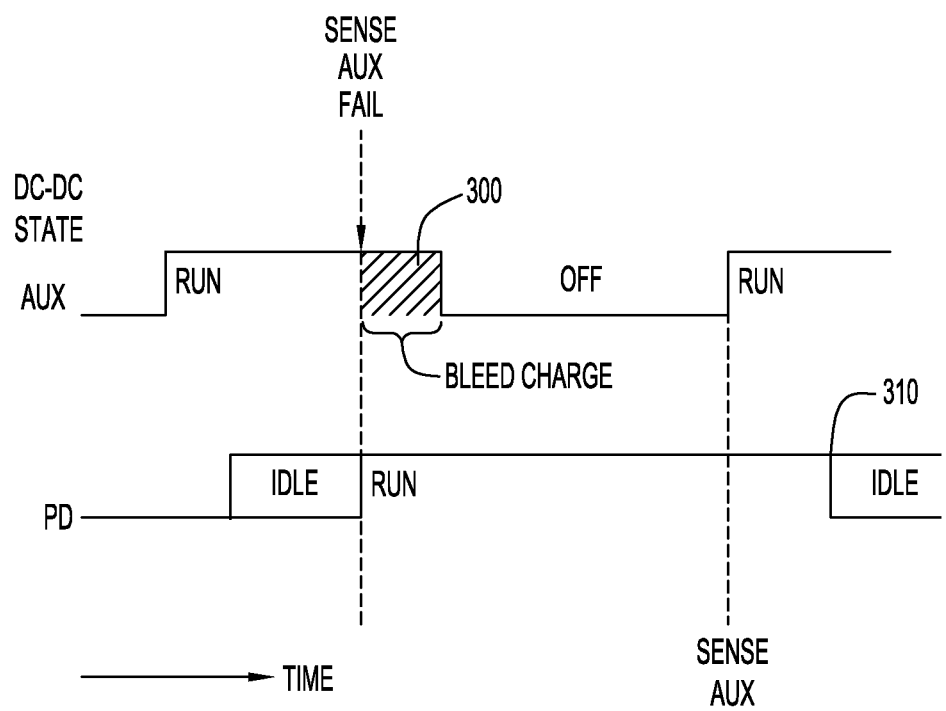
FIG. 13 is a timing diagram depicting example operations when switching between auxiliary power and powered device power.

Reference is now made to FIG. 13. FIG. 13 illustrates timing when switching between auxiliary power and PD power.

The auxiliary supply is either in an on RUN or OFF state. It does not have an IDLE state. The PD supply can be in one of three states:

OFF, no power source is connected to it.

IDLE power connected to the PD and the PD is drawing a minimum power level.

RUN power connected to the PD and the PD may draw up to a maximum power level.

Bulk capacitors (part of the circuits 90 and 100) store electrical charge (energy) from the power sources (PD and AUX). As shown in FIG. 13, when AUX is in the RUN state and a failure is detected, the shut down of the AUX power is delayed as shown at 300. Once charge is bled from the bulk capacitors, the AUX power is switched off. The delay is determined by how fast the enabled DC-DC converter takes to assume the system power demand. The energy stored in the bulk capacitors of the DC-DC converter, which no longer has a power source connected to it, may have a small or large amount of energy to be bled. On the other hand, the AUX state can switch directly to the RUN state from the OFF state. The IDLE_EN signal enables the AUX sense circuit 90 to cause a transition from RUN to IDLE for the PD DC-DC converter 70(2). When a failure or disconnection of the AUX power is detected, the PD power is switched to RUN (even before the AUX power is OFF). The PD power stays in the RUN state until and if AUX power is restored (AUX power supply is reconnected), a period of time after which the PD power can be switched to an IDLE state under control of the IDLE_EN signal as shown at 310. Thus, the PD power is put in an IDLE state some period of time after the AUX power is restored.

As another example, Table 1 above shows that when the system is powered by AUX ($P_{source}$ is 51 W). If the system is also connected to a Type 2 and Type 1 uplink, Table 2 above shows that the loss of AUX power reduces the available power by 12.5 W. Assuming three PoE ports are connected that are providing 4, 7, and 10 W, respectively, the ports that provide 4 and 10 W (14 W) or the ports that provide 7 and 10 W (17 W) can be enabled to have their power removed to enable the hardware recovery of a single power source fault.

In a further aspect, the MCU 50 (FIG. 1) may have an integrated temperature sensor or a separate temperature sensor reports the temperature of critical components or report monitored temperature data to estimate ambient temperatures. Critical components have the least thermal margin.

The MCU 50 reads and processes the temperature data. The data is used to estimate the thermal margin for system components. When the thermal margin is approaching 0 or some other desired limit, the system may shed low priority inline power load to reduce system heat dissipation. This lowers system component temperatures.

After a load shed the system continues to monitor thermal margin so that either more inline power load may be shed as explained above or if sufficient margin exists the inline powered device previously powered off may be powered on after following standard detection and power-on steps. Sufficient margin is reached when more than 0 margin is available. A value of 5 to 10 degrees C. is typically used. Additional inline power load may be added if system thermal margins are not large enough.

The above description is intended by way of example only. Various modifications and structural changes may be made therein without departing from the scope of the concepts described herein and within the scope and range of equivalents of the claims.

What is claimed is:

1. A method comprising:
    collecting power from a plurality of power sources including one or more inline power sources and one or more auxiliary power sources, wherein the inline power sources provide power and data, and wherein the auxiliary power sources provide only power;
    configuring, during a setup phase, whether each power source is to be monitored for removal;
    supplying power to powered network circuits from the collected power and supplying any excess power from the collected power to downlink inline equipment as load power;
    detecting, if a particular power source is to be monitored for removal, removal of the particular power source by determining a voltage drop rate of a voltage associated with the particular power source; and
    responsive to a determination that the voltage drop rate is lower than a predetermined threshold and the voltage is below a predetermined voltage threshold, reducing the load power when the detected removal of the particular power source reduces the power supplied to the powered network circuits.

2. The method of claim 1, further comprising:
    responsive to a determination that the voltage drop rate is greater than the predetermined rate threshold, reducing the load power before the voltage drops below the predetermined voltage threshold.

3. The method of claim 1, wherein reducing comprises reducing power load according to stored data indicating power reductions for different combinations of types of uplink power sources and types of downlink inline equipment.

4. The method of claim 1, wherein detecting further comprises detecting when an auxiliary power source is removed, and wherein reducing load power is based upon detecting removal of the auxiliary power source.

5. The method of claim 4, and further comprising upon detecting removal of the auxiliary power source, delaying shut down of power from the auxiliary power source for a period of time while stored electrical charge depletes, initiating use of power from one or more of the inline power sources upon detecting that the stored electrical charge is substantially depleted.

6. The method of claim 5, and further comprising detecting reconnection of the auxiliary power source, and a period of time thereafter, returning power from one or more of the inline power sources to an idle state.

7. The method of claim 1, wherein collecting comprises collecting power from first and second inline power sources, and wherein detecting comprises detecting removal of a particular one of first and second inline power sources.

8. The method of claim 7, wherein collecting comprises collecting power of a first type from the first inline power source and collecting power of a second type from the second inline power source.

9. An apparatus comprising:
 a first power source sense circuit configured to detect presence of power from an inline power source;
 a power removal circuit configured to detect removal of a particular power source by determining a voltage drop rate of a voltage associated with the particular power source; and
 a controller coupled to the power removal circuit, the controller being configured to:
  generate controls to supply power to powered network circuits from collected power from the power sources and to supply excess power from the collected power to downlink inline equipment as load power;
  receive a signal supplied by the power removal circuit that indicates removal of the particular power source by a determination that the determined voltage drop rate is above a predetermined rate threshold; and
  reduce load power before the voltage of the particular power source falls below a predetermined voltage threshold and the removal of the particular power source reduces the power supplied to operate the powered network circuits.

10. The apparatus of claim 9, and further comprising a second power sense circuit configured to detect power from an auxiliary power supply and to detect when power from the auxiliary power supply is removed, wherein the controller is configured to reduce load power based further on the removal of the auxiliary power supply.

11. The apparatus of claim 10, wherein the second power sense circuit is further configured to, upon detecting removal of the auxiliary power supply, delay shut down of power from the auxiliary power supply for a period of time, and the controller is configured to initiate use of power from one or more of the inline power sources upon removal of the auxiliary power supply.

12. The apparatus of claim 11, wherein the controller is further configured to, upon reconnection of the auxiliary power supply, return power from one or more of the inline power sources to an idle state a period of time after reconnection of the auxiliary power supply.

13. The apparatus of claim 9, wherein the first power source sense circuit comprises an operational amplifier and a comparator, the operational amplifier being configured to receive as input a voltage associated with an inline power source and to detect a peak and drop of the voltage, and the comparator having a first input that receives a voltage based on a sum of the peak voltage and a reference voltage and a second input that receives the reference voltage, and the comparator configured to generate an output indicating detection of an inline power source when voltage at the first input is greater than voltage at the second input.

14. The apparatus of claim 13, wherein the operational amplifier of the first power sense circuit is configured to allow for slew rates of the voltage from an inline power supply that exceed a value allowed by an industry standard specification for inline power systems to cause the comparator to transition to an inline power source removed state before a minimum inline power source voltage threshold is reached.

15. The apparatus of claim 13, and further comprising a feedback circuit coupled between the output of the comparator and the first input, wherein the feedback circuit comprises a resistor and capacitor connected in parallel to each other, so as to create hysteresis for a point where the comparator output changes.

16. An apparatus comprising:
 a first power source sense circuit configured to detect presence of power from an inline power source;
 a second power source sense circuit configured to detect presence of power from an auxiliary power supply;
 a power removal circuit configured to detect removal of the auxiliary power source by determining a voltage drop rate of a voltage associated with the auxiliary power source; and
 a controller coupled to the second power source sense circuit and the power removal circuit, the controller being configured to:
  generate controls to supply power to powered network circuits from collected power from the power sources and to supply excess power from the collected power to downlink inline equipment as load power;
  receive a signal from the power removal circuit indicating detection of removal of the auxiliary power supply by a determination that the voltage drop rate is above a predetermined rate threshold; and
  generate a control to reduce load power based on the removal of the auxiliary power supply before the voltage associated with the auxiliary power source falls below a predetermined voltage threshold and the removal of the auxiliary power source reduces the power supplied to operate the powered network circuits.

17. The apparatus of claim 16, wherein the second power sense circuit is further configured to delay shut down of power from the auxiliary power supply for a period of time after detecting its removal, and the controller is configured to initiate use of power from one or more of the inline power sources upon detecting removal of the auxiliary power supply.

18. The apparatus of claim 17, wherein the controller is further configured to return power from one or more of the inline power sources to an idle state after reconnection of the auxiliary power supply is detected.

19. The apparatus of claim 16, and further comprising a first power source sense circuit for each of a first and second inline power sources, and wherein the controller is configured to control the power removal circuit to respond to detection of removal of a particular one of the first and second inline power sources.

20. The apparatus of claim 16, wherein the first power source sense circuit is configured to sense power from an inline power source of a first type or a second type.

* * * * *